United States Patent
Grueger et al.

(10) Patent No.: US 6,781,368 B2
(45) Date of Patent: Aug. 24, 2004

(54) ROTATION ANGLE SENSOR

(75) Inventors: Heinrich Grueger, Dresden (DE); Ralf Gottfried-Gottfried, Dresden (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

(21) Appl. No.: 10/467,981

(22) PCT Filed: Mar. 13, 2001

(86) PCT No.: PCT/EP01/02830
§ 371 (c)(1),
(2), (4) Date: Feb. 11, 2004

(87) PCT Pub. No.: WO02/068911
PCT Pub. Date: Sep. 6, 2002

(65) Prior Publication Data
US 2004/0130316 A1 Jul. 8, 2004

(30) Foreign Application Priority Data
Feb. 22, 2001 (DE) ........................ 101 08 566

(51) Int. Cl.⁷ .................................. G01B 7/14
(52) U.S. Cl. ............... 324/207.2; 324/207.25
(58) Field of Search ............ 324/207.11, 207.13, 324/207.2, 207.25, 234–235, 242–243; 73/DIG. 2–3

(56) References Cited
U.S. PATENT DOCUMENTS
3,838,263 A  9/1974 Haeusler et al.

FOREIGN PATENT DOCUMENTS

| DE | 32 44891 A1 | 7/1984 |
| EP | 0 591 113 A1 | 6/1994 |
| EP | 0 723 136 A1 | 7/1996 |
| WO | WO 96/10731 | 4/1996 |

*Primary Examiner*—Bot LeDynh
(74) *Attorney, Agent, or Firm*—Beyer Weaver & Thomas LLP

(57) ABSTRACT

An apparatus for detecting a rotation angle of a rotation around an axis of rotation includes a transducer magnet for generating a magnetic field as well as a plurality of magnetic-field-sensitive sensor elements for detecting the magnetic field. The magnet and the plurality of magnetic-field-sensitive sensor elements are arranged such that, during a rotation around the axis of rotation, the plurality of magnetic-field-sensitive sensor elements circles relative to the transducer magnet around the same. By the plurality of magnetic-field-sensitive sensor elements, a scale is defined, with the transducer magnet being arranged such that the generated magnetic-field comprises a characteristic on a locus on the scale, and the locus on the scale being dependent on a partial area of a full rotation in an unique manner from the rotation angle. The transducer magnet is magnetized inclined to the axis of rotation. The apparatus enables on the one hand a simple transducer magnet structure and on the other hand an accurate and easy measuring processing process.

16 Claims, 3 Drawing Sheets

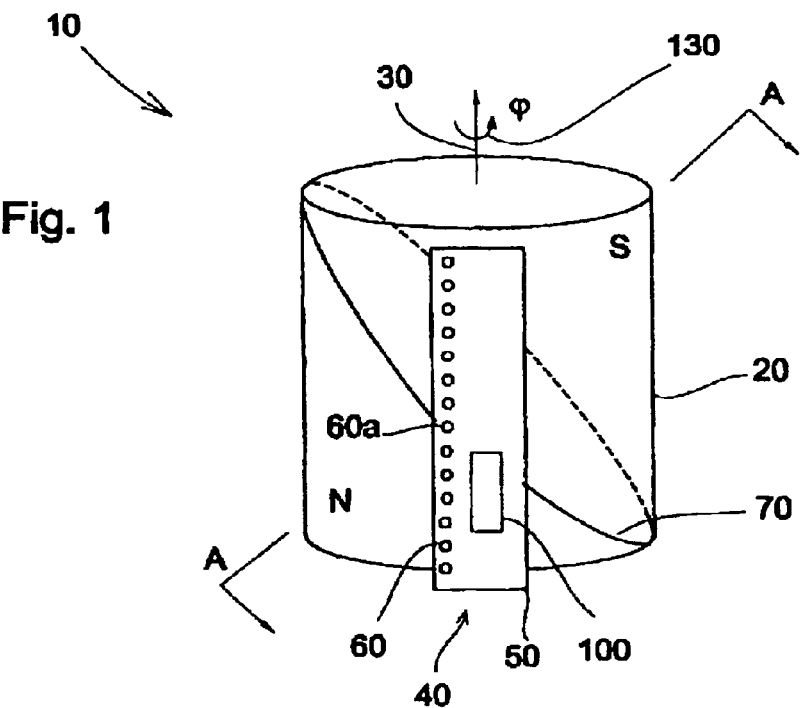
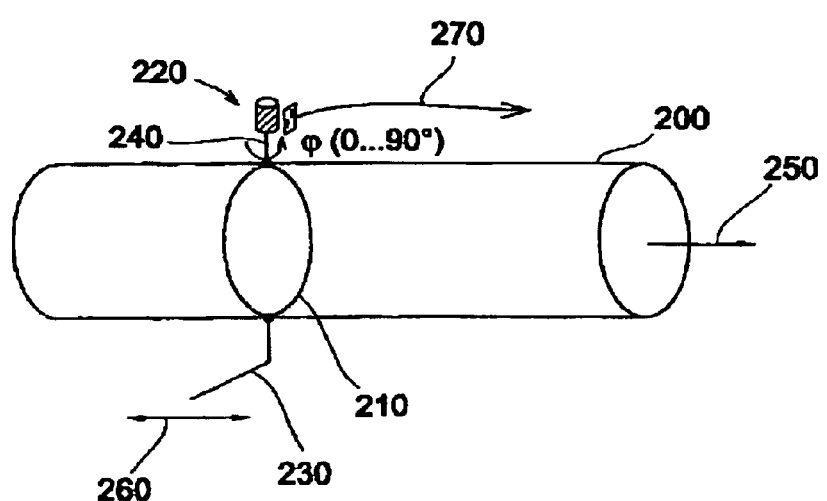

ROTATION ANGLE SENSOR

BACKGROUND OF THE INVENTION

1. Field of the Invention

The present invention relates to the detection of rotation angles, such as e.g. the rotation angle of a throttle flap of a throttle valve. In particular, the present invention relates to apparatus or sensors for detecting rotation angles operating on an analogue magnetic basis.

2. Description of Prior Art

Nowadays, the orientation of a rotary part as an absolute value and/or the rotation angle, which the rotary part includes with a fixed reference point, is often required for further processing, such as, for example, a feedback control or similar. These rotatable parts include both freely rotatable parts, such as, for example, axes and shafts of drives, and parts which are only rotatable in a partial area of the full circle, i.e. by less than 360°, such as, for example, rotary regulators or throttle flap valves. For measuring the rotation angle varying sensor systems or arrangements are currently known, which differ from each other both with respect to their accuracy, their reliability and their manufacturing cost. Basically, these sensor types may be organized into two different types, i.e. contact systems on the one hand and contactless systems on the other.

Contact systems are mostly based on a potentio-metric measurement and, due to their simple structure, characterize themselves by very low manufacturing costs. However, a great disadvantage of the contact systems consists in that high temperature drifts result in these systems and, when vibrations and oscillations occur, such as, for example, in a valve in a motor vehicle, even when the measuring system comprises a fixed rotary position, small movements of high frequencies may occur, which may result in a great wearout and in a premature failure of the system.

Contactless systems, in turn, can be subdivided into those of the analog and of the digital type. In contactless systems of the digital type, a more complex transducer is required, which logically subdivides the desired circle area, i.e. the area of possible rotation angles, into several partial segments. A known possibility includes, for example, a transducer structure in the form of a tooth gear or shaft gear which has a tooth missing at a certain position. Both the "vacancy" and the existing teeth may be detected by a suitable sensor technology operating on an optical or magnetic basis, with an angle position being detected by counting the teeth following the vacancy. Although only a transducer and a sensor are required for this, a disadvantage of this solution consists in that the determination of the angle may not be carried out until after the first pass or the first detection of the specifically marked position, i.e. of the missing tooth.

A further prior art realization of a contactless system of a digital type includes a complex transducer consisting of several transducer parts as well as one sensor each per transducer part. Each transducer part subdivides the desired circle area, i.e. the area of possible rotation angles, into various partial segments. The detection of the partial segments by the sensors may be carried out optically or magnetically, for example, via slot metal sheets. When suitably subdividing the desired circle areas, for example, by halving, quartering, etc. of the same, it may be achieved that the output signals of all sensors together indicate the value of the rotation angle in a digitally encoded form with a solution of one bit per sensor/transducer pair. For a resolution of approximately 1°, nine bits (512 possibilities) have to be encoded, and, as a consequence, nine transducer components and nine sensors are required for this purpose. On the basis of the suitable subdivision into partial segments, the signal is consequently available in digital form without any further A/C conversion. However, a disadvantage of these solutions consists in that an increase of the resolution may only be carried out by adding further transducer components and sensors. The higher the resolution to be achieved, the more complicated the required transducer is.

Conventionally, contactless analog systems operate with a simple magnet as a transducer and two analog magnetic-field sensors arranged to each other under 90°. Typically, magneto-resistive (MR) or Hall sensors are used. The transducer magnet is arranged such that its north/south axis runs in a radial direction, such that the magnetic-field sensors output signals of a sine and/or cosine course, from which the current rotation angle may be calculated. The resolution will be determined from the accuracy of the magnetic-field sensors, the environment influences and the conversion depth of the subsequent analog/digital conversion. Dependent on the arrangements of two sensors under exactly 90°, a great deal of labour and time is necessary for realizing this solution, making it relatively cost intensive.

On the basis of the technical conditions, contactless measurements are frequently necessary in many fields of applications and are of a considerable advantage. On the other hand, these contactless measurements are more complex and thus more expensive. For applications with an extremely high number of pieces, manufacturing costs for a rotation angle sensor play a very important role. Therefore, there is a need for a less complex contactlessly measuring rotation angle sensor.

In accordance with DE 3244891 C1, a system for detecting positions with linear motions is known, in which a simple magnet arranged in direction of the linear motion and a series of sensors arranged equidistantly and parallel to the linear motion, together defining a scale, are used. The sensors arranged in series detect the magnetic field, with the zero crossing of the vertical field component, which results from a central level through the magnet, being determined from the measurement, with the locus of the zero crossing indicating the locus of the magnet.

SUMMARY OF THE INVENTION

The object of the present invention consists in providing an apparatus for detecting a rotation angle of a rotation around an axis of rotation, which is less complex with comparable measuring qualities.

In accordance with the present invention this is achieved by an apparatus for detecting a rotation angle of a rotation around an axis of rotation, comprising a transducer magnet for generating a magnetic field and a plurality of magnetic-field-sensitive sensor elements for detecting the magnetic field, with the transducer magnet and the plurality of magnetic-field-sensitive sensor elements being arranged such that, when rotating around the axis of rotation, the plurality of magnetic-field-sensitive sensor elements circles around the same relative to the transducer magnet, and wherein the plurality of magnetic-field-sensitive sensor elements define a scale. The transducer magnet are arranged such that the generated magnetic field comprises a characteristic at a locus on the scale, and the locus on the scale uniquely depends on the rotary angle at least for a partial area of a full rotation. The transducer magnet is magnetized inclined to the axis of rotation.

The present invention is based on the recognition that the susceptibility of the potentio-metric systems, the complexity of contactless systems of the digital type with respect to the transducer structure, and the analog/digital conversion in the analog sine/cosine signal systems may be eliminated in that a transducer magnet and a scale defined by a plurality of magnetic-field-sensitive sensor elements which are arranged such to each other that the generated magnetic field comprises a characteristic at one location on the scale and that the locus on the scale uniquely depends at least for a partial area of a full rotation on the rotation angle. In this manner, it is on the one hand possible to use a simple transducer structure as is for example the case in the sine/cosine signal systems and to determine, and, on the other hand, to determine the rotation angle position from the measured magnetic-field data in a manner which is both simple and may be adapted to the desired resolution. In contrast to the above-mentioned contactless systems of the analog type, an inventive sensor and/or an inventive apparatus, for example, does not require any complex sine and cosine multiplier for evaluation, while, at the same time, as compared to the contactless systems of the digital type, the transducer structure may be clearly more simple.

The transducer magnet and the plurality of magnetic-field-sensitive sensor elements may be arranged such, that, when rotating around the axis of rotation, the plurality of magnetic-field-sensitive sensor elements circle around the same relative to the transducer magnet. Expressed differently, either the transducer magnet is fixedly arranged and the plurality of sensor elements are attached to the axis of rotation or the transducer magnet is attached to the axis of rotation and the plurality of sensor elements is fixedly arranged such that, when rotating around the axis of rotation, either the plurality of sensor elements circle around the transducer magnet or the transducer magnet rotates around the axis of rotation, while the plurality of sensor elements is fixedly arranged.

In one embodiment, the transducer magnet is magnetized inclined to or in an angular relationship to the axis of rotation. In this way the transducer magnet generates a magnetic field comprising a characteristic intersecting the scale defined by the plurality of sensor elements at a locus, which, in the case of rotations within at least one partial area of the full circle, uniquely depends on the rotation angle. In a special embodiment, the rotation angle area, for which the locus uniquely depends on the rotation angle, includes for example an area of 180° or 90°.

A clear connection between the locus and the rotation angle in the full circle and/or within a rotation angle area spanning 360°, may be achieved, if this is not already the case by the generated magnetic field alone, in that, for example, a further signal is generated indicating a partial area of the rotation angle of a plurality of partial areas of a rotation angle, in which the rotation angle is currently located, or, expressed differently, which subdivides the rotation angle area into a plurality of partial areas of the rotation angle. By receiving the signal indicating the partial area of the rotation angle, clear inferences can be made as regards the rotation angle from a combination from this signal and the locus on the scale within the total full circle.

A further possibility for extending the rotation angle area with a unique assignment between the rotation angle and the locus of the magnetic-field characteristic consists in duplicating the plurality of sensor elements such that a second plurality of sensor elements with the same function is offset relative to the first plurality of sensor elements by a rotation around the axis of rotation. In this case, a combination of the loci on the first scale and a second scale, which is defined by the second plurality of sensor elements, in which the generated magnetic field comprises the characteristic, uniquely depends on the rotation angle within the total full circle.

The sensor elements may be arranged on a level which is spaced from the axis of rotation and which is parallel to the same, such that an integration of the sensor elements into a die, such as for example in the form of Hall sensors, is possible. In a special embodiment, the sensor elements are arranged in the form of a two-dimensional or one-dimensional array. A preferred arrangement of the sensor elements includes a linear arrangement of the same in parallel to the axis of rotation.

The characteristic comprising the generated magnetic field at the locus on the scale defined by the sensor elements may be a zero crossing, a relative minimum or a relative maximum of a component of the magnetic field in any predetermined direction or the amount of the magnetic field. The loci, at which the magnetic field comprises the characteristic, form a geometric extension rotating around the axis of rotation relative to the sensor elements during a rotation around the axis of rotation. Within a rotation angle area to be detected, the geometric extension intersects the scale defined by the sensor elements at a certain locus. This locus of the magnetic-field characteristic on the scale uniquely depends on the rotation angle within the rotation angle area to be detected. The locus may be determined from the magnetic-field data of the sensor elements, for example, by means of interpolation, while, within the rotation angle area to be detected, a clear inference may be made from the locus on the rotation angle. In accordance with a special embodiment, the previously mentioned characteristic of the magnetic-field includes, for example, the zero crossing of the radial component of the magnetic field, with the loci, at which the magnetic field comprises this characteristic, forming an essentially vertical surface to a magnetization direction of the transducer magnet.

In contrast to conventional sensor systems, an inventive sensor is especially advantageous in that the sensor part is adapted to be integrated into a single die, which, for example, may be manufactured in a CMOS standard technology, thereby maintaining manufacturing costs at a low level. In addition, the transducer magnet may be manufactured in a much simpler and inexpensive manner than is the case with digital angle position transducer. A high degree of accuracy may be achieved without any extremely high resolving analog/digital converters being necessary. In addition, the orientation information and/or the detected rotation angle are immediately available, for example immediately after turning on the sensor, other than is the case in the previously described contactless sensor system of the digital type having the missing gear.

BRIEF DESCRIPTION OF THE DRAWINGS

Preferred embodiments of the present invention will be explained in detail below with reference to the attached drawings, in which:

FIG. 1 shows a prospective view of a special embodiment of a rotation angle sensor in accordance with the present invention;

FIG. 4 shows a throttle flap valve, in which the sensor from FIG. 1 is used.

DESCRIPTION OF PREFERRED EMBODIMENTS OF THE INVENTION

Figure 2:
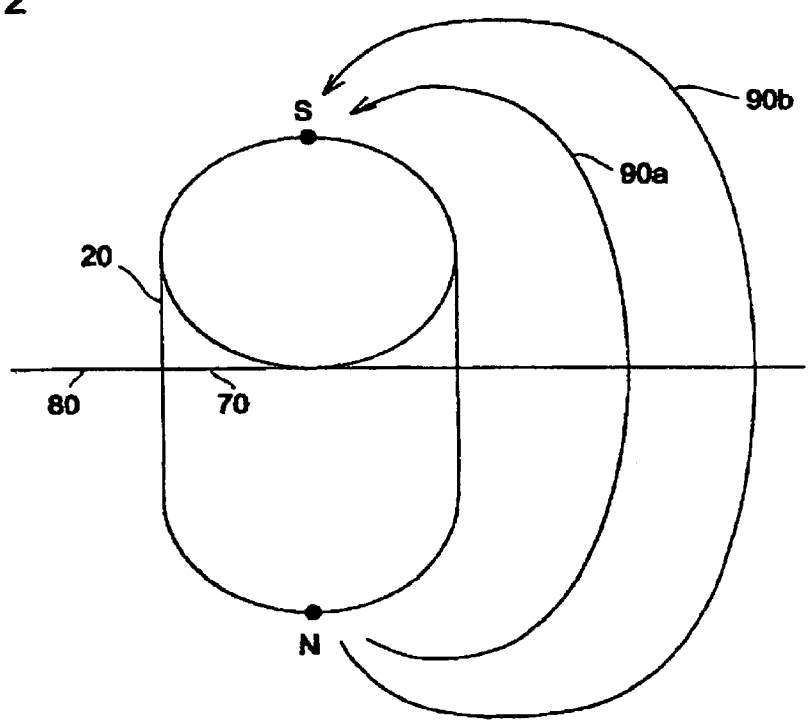
FIG. 2 shows a projection view of the transducer magnet of the sensor from FIG. 1 from a line of vision as is indicated by the markers A—A in FIG. 1, and which is perpendicular to the direction of magnetization of the transducer magnet.

First, reference is made to FIG. 1, which shows a special embodiment for a rotation angle sensor in accordance with the present invention. The rotation angle sensor, which is generally indicated at 10, includes a transducer magnet 20, which is fixedly arranged on an axis of rotation 30, as well as a fixedly arranged detector arrangement 40 consisting of a planar carrier substrate 50 and magnetic-field-sensitive sensor elements arranged thereon and serving as a reference point for determining the rotation angle φ of the axis of rotation 30.

The transducer magnet 20 has a cylindrical shape and is attached to the axis of rotation 30 with its symmetry axis coinciding with the axis of rotation 30. The transducer magnet 20, as is indicated in FIG. 1 with "S" for the magnetic South Pole and "N" for the magnetic North Pole, is magnetized along its surface diagonal and/or along a diagonal of a rotation surface running in parallel to the drawing level in FIG. 1, with the rotation angle φ being included between the direction of magnetization and the reference point of the detector arrangement 40.

In an especially preferred embodiment, as is shown in FIG. 1, the heights of the cylinder-shaped transducer magnets 20 and the diameter of the same are selected to be equal. By selecting the dimensions of the transducer magnets 20 in this way, a high symmetry and an especially regular level course are defined, along which the radial component of the magnetic-field generated by the transducer magnet 20 is zero and comprises a zero crossing. The intersection line of the outer jacket of the cylindrical transducer magnet 20 with the level in which the radial magnetic field is zero, is illustrated in FIG. 1 at 70.

In order to illustrate the generation of the intersection line 70, a projection view of the transducer magnet 20 is indicated in FIG. 2 from a line of vision shown at A—A. In FIG. 2, the direction of magnetization of the transducer magnets 20 runs in parallel to the projection and/or drawing level. A line 80 indicates the level, in which the radial component of the magnetic-field generated by the transducer magnet 20 is zero. At 90a and 90b two magnetic-field lines of the magnetic-field generated by the transducer magnets 20 are exemplarily shown, which, as can be seen from FIG. 2, vertically intersect the level 80, which is why the radial component of the magnetic-field is zero at the points of intersection of the magnetic-field lines 90a and 90b with the level 80.

Turning once more to FIG. 1, the carrier substrate 50 is spaced from the transducer magnet 20 and from the axis of rotation 30 and fixedly arranged in parallel to the same, with the magnetic-field-sensitive sensor elements 60 being linearity arranged on the carrier substrate 50, so as to extend themselves in parallel to the axis of rotation 30, and being arranged such so as to detect the radial component of the generated magnetic-field. Moreover, the magnetic-field-sensitive sensor elements are arranged at fixed distances to each other, so as to define a scale running through the same and in parallel to the axis of rotation 30. In the embodiment shown in FIG. 1, the sensor elements are arranged equidistantly to each other.

In a preferred embodiment, the detector arrangement 40 is integrated within a single die, which includes Hall sensors as the magnetic-field-sensitive sensor elements and within which an evaluation circuit 100 may be additionally integrated, which carries out the evaluation of the sensor signals of the sensor elements explained below.

In one realization of the sensor shown in FIG. 1, Hall sensors are arranged in a linear arrangement in the die 50 as magnetic-field-sensitive sensor elements, with the same being integrated onto the semiconductor chip at a distance of 151.2 μm among each other, and with the die being positioned with respect to the axis of rotation such that the Hall sensors measure the radial field from the transducer magnet with respect to the axis of rotation and the series of Hall sensors are along the axis. In this realization, the diameter of the transducer magnet is 4 mm and the height of the same is also 4 mm.

After describing the structure of the sensor from FIG. 1 herein above, the functionality of the same will be described below, it being explained at first, how the locus of the radial zero-field crossing may be determined from the measuring values of the sensor elements of the detector arrangement.

As is shown in FIG. 1, the detector arrangement 40 is near the transducer magnet 20. As may also be seen, in the rotation angle position φ shown in FIG. 1, the level of the radial zero-field crossing of the magnetic-field generated by the transducer magnet 20, which intersects the outer jacket of the transducer magnet 20 at the line of intersection 70, passes inclined to the scale through a sensor element 60a. As a consequence, the radial magnetic-field detected by the sensor element 60a is zero. In addition, the sensor elements arranged above the sensor element 60 detect a radial magnetic-field which is opposite to the one, which is arranged below the sensor element 60a.

Figure 3A:
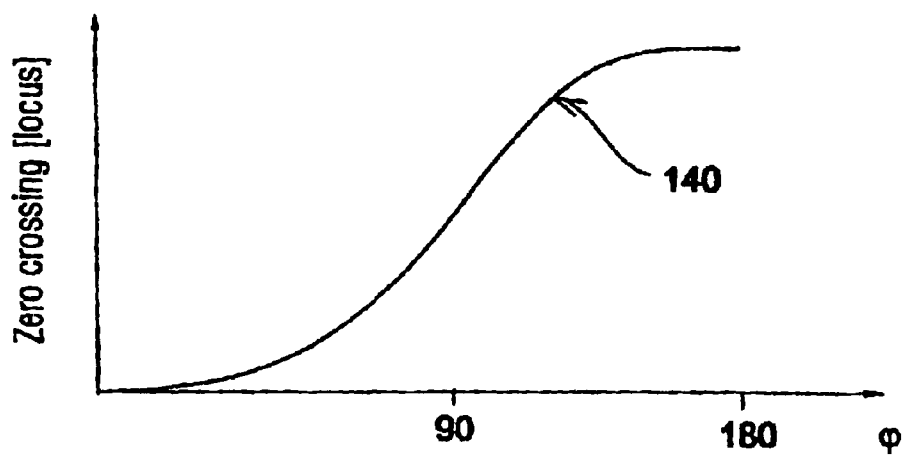
FIG. 3a shows a graph showing the dependence of the locus of the zero crossing of the radial component of the magnetic field on the scale defined by the sensor elements as a function of the rotation angle φ at the sensor from FIG. 1.
Figure 3B:
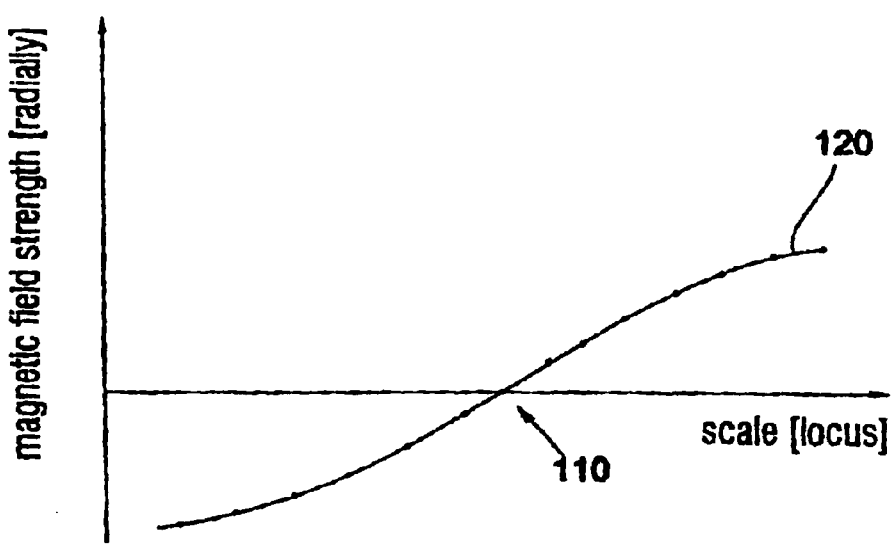
FIG. 3b shows a graph illustrating the course of the radial magnetic-field strength along the scale formed by the sensor elements in the illustration shown in FIG. 1.

These facts are illustrated in FIG. 3b. FIG. 3b shows a graph, in which the x-axis corresponds the scale defined by the sensor element 60 (FIG. 1), and along the y-axis the radial magnetic-field strength is plotted in arbitrary units. The measuring points represent the magnetic-field strength detected by the sensor elements in a radial direction. The measuring value or the measuring point 110 is for example the measuring value detected by the sensor element 60a (FIG. 1) for the radial magnetic-field strength, which, as has been already mentioned, is zero in the sensor element 60a in the rotation angle position of the transducer magnet shown in FIG. 1. In addition, the radial component of the generated magnetic-field comprises an opposing direction and/or a different sign in the sensor elements arranged further above and further below adjacent to the sensor elements 60a. In the present case, the locus of the radial zero-field crossing corresponds to the locus of the sensor element 60a on the scale.

In the general case, where the zero crossing of the radial magnetic-field strength does not coincide with the locus of a magnetic-field-sensitive sensor elements, the locus of the zero crossing along the scale defined by the sensor elements may, for example, be determined by means of interpolation, with the zero crossing of the resulting interpolation curve indicating the locus of the zero crossing of the radial magnetic-field on the scale. The curve 120 illustrates, for example, a least-square error fit using a polynomial of a predetermined order, which is achieved using all the measuring values. The interpolation, however, may also be carried out in a different manner, such as, for example, by a section-wise polynomial interpolation, such as for example a section-wise linear interpolation. By means of the interpolation, the zero crossing locus may be determined with much higher accuracy than the distance between the magnetic-field-sensitive sensor elements.

For further details with respect to the interpolation and the realization of the same for determining the locus of the zero crossing of the radial magnetic-field on the scale, reference is made to the document DE 3244891 C2, which is incorporated herein by reference, and to the Insafa system of the Fraunhofer Gesellschaft. The locus of the zero crossing, however, might be determined by a different method, such as, for example, by a neuronal network which uses all or a part of the measuring values as input values.

As will be explained in detail below, inferences may be made as regards the rotation angle from the determined locus along the scale. For this purpose, reference is first made to FIG. 1. During a rotation of the transducer magnet 20, the magnetic-field rotates together with the transducer magnet 20, which has been generated by the same, as well as the level, on which the radial component of the magnetic-field is zero and which is illustrated by the intersection line 70. In the case that a rotation of the transducer magnet 20 around the axis of rotation 30 takes place in the direction indicated by arrow 130 from FIG. 1, the locus of the zero crossing shifts upwards along the scale in an axial direction. In the case of a reverse rotation, the locus of the zero crossing shifts downwards on the scale defined by the sensor elements in a reverse axial direction. From the resulting shifting of the locus of the zero crossing along and on the scale, there will be a change of the magnetic-field strengths detected by the sensor elements in a radial direction, from which the rotation angle may be calculated as will be described below.

FIG. 3a shows a graph in which the rotation angle φ on the x-axis and the locus of the zero crossing on the y-axis on the scale is plotted in arbitrary units. The rotation angle shown in FIG. 1 has been arbitrarily assigned the rotation angle 90° in FIG. 3b. As can be seen from FIG. 3a, when rotating the transducer magnet 20 around the axis of rotation 30 (FIG. 1), the course of the locus of the zero crossing of the radial magnetic-field along the scale defined by the sensor elements, which is indicated at 140, will result. Therefore, the course 140 represents the connection between the determined locus on the scale and the rotation angle. As may also be seen, the course 140 in the area from 0 to 180° is strictly monotonous, meaning that the locus of the zero crossing of the radial component of the magnetic-field generated by the transducer magnet is uniquely dependent on the rotation angle. As a consequence, after determining the locus of the zero crossing on the scale using the course 140, inferences may be made as regards the rotation angle φ. If the course shown in FIG. 3b is for example present in analytical form, the rotation angle may be determined from the determined locus on the scale, for example by calculation. If the course 140 is available in a sampled or stored form in a look-up table, the rotation angle may be determined by quantizing the determined locus on a scale and subsequent looking up by using the quantized value as an index.

The determination of the locus of the zero crossing on the scale defined by the sensor elements explained with reference to FIG. 3b and the inference as regards the rotation angle φ, which was described with reference to FIG. 3a, using the determined locus may, for example, be implemented in a hardware and are preferably integrated within the evaluation circuit 100 (FIG. 1), such that both the sensor elements and the evaluation circuit may be integrated on a single die 50. In a preferred embodiment, the die 50 has been manufactured in CMOS standard technology, with Hall sensors as magnetic-field-sensitive sensor elements in addition to the evaluation circuit 100 being integrated within the same.

As has been described with reference to FIG. 3a, from the known course of the locus of the zero crossing of the radial component of the magnetic-field as a function of the absolute rotation angle, the rotation angle may be uniquely determined at least for a rotation angle area of 0 to 180° from the locus determined on the scale. For uniquely determining the rotation angle from the determined locus on the scale beyond the total full circle, additional information is necessary, since the course shown in FIG. 3a repeats itself for the rotation angle area from 180 to 360°. The resulting ambiguity may be overcome by an additional digital encoding and/or by subdividing the partial areas, such as, for example, by magnets additionally attached to the axis of rotation. A radially magnetized magnet may be used, for example, so as to generate a binary signal and/or a magnetic-field indicating the areas from 0° to 180° and/or from 180° to 360° and making the same distinguishable. An alternative embodiment for overcoming the ambiguity of the mapping between the locus of the zero crossing of the scale and the rotation angle provides, instead of the one-dimensional sensor element arrangement, as is shown in FIG. 1, a two-dimensional arrangement of the magnetic-field sensitive and/or magnetic-field sensitive sensor elements which provide the necessary information via an additional analogous evaluation of the measured magnetic-field, such as, for example, by a second evaluation circuit, using an offset angle for eliminating the ambiguity. The sensor elements may for example be arranged in a two-dimensional array, through which, in adjacent columns running in parallel to the axis of rotation, two scales arranged under an offset angle may be defined. Similarly, it is possible to provide a second detector arrangement offset from the first detector arrangement shown in FIG. 1 by a rotation around the axis of rotation, which determines the second locus on a second scale, with the determined two loci together uniquely determining the rotation angle on the total full circle.

With the rotation angle sensor described with reference to FIGS. 1 to 3a and 3b, the achievable accuracy by interpolation is 12 bit or is more, related to a rotation angle area of 180°. The detected absolute angle values will be made available in digital form. An advantage of the system consists in that the orientation values and/or angle values are immediately available after putting the sensor into operation and, therefore, a rotation until reaching a specifically marked spot, as is the case in the previously described contactless sensor of the digital type with a gear having a missing tooth, is not necessary. By using several sensors, an accuracy can be reached, which is much higher than the digital conversion of an individual analog sensor signal of a sensor element. The accuracy of the sensor may be increased by decreasing the distance of the sensor elements, without having to make any changes to the electronic wiring scheme, such as, for example, the resolution of the analog/digital conversion, as a result of which advantages as regards the manufacture and/or redevelopment or further development of the sensors will result. In addition, the sensor works on a contactless basis and is therefore not subjected to mechanical wear. Due to the fact that a certain characteristic of the transducer magnet, typically the zero crossing of the radial field, is used, the arrangement is very insensitive towards changes of the absolute magnetic field or the sensitivity of the sensitive elements, which may not be totally avoided within the framework of temperature changes.

In addition, the evaluation part and the detector part may together be integrated within a single die, as a result of which, in particular with very high numbers of pieces during manufacture, a highly optimized manufacturing process may be achieved.

An exemplary application for an inventive rotation angle sensor is the position of the throttle flap in a fluid tubing. The angle area occurring here overspans 90°. Given a current realization of the inventive sensor, a resolution of approximately 0.05 to 0.1° may be expected.

FIG. 4 shows the sensor from FIG. 1, as it is used for detecting the position of a throttle flap in a tubing. FIG. 4 shows a tubing 200, a throttle flap 210, which may rotate in a rotation angle area from 0 to 90°, a rotation angle sensor 230, such as the one from FIG. 1, an adjustment means 230, which is merely exemplarily illustrated as a lever in FIG. 4, as well as an axis of rotation 240 fixedly connecting the transducer magnet of the sensor 220 to the throttle flap 210. The position of the throttle flap 210 shown in FIG. 4 corresponds to a closed position, in which a gas flow or liquid flow 250 in the tubing 200 is blocked. By adjusting the throttle flap 210 by means of the adjustment means 230, as is illustrated by a double arrow 260, the throttle flap may be rotated by as much as 90° so as to enable the fluid flow 250. Via a digital bus 270 for data transmission to, for example, a computer or any other control means, the sensor 220 outputs in digital form the current absolute rotation angle $\phi$, which has been determined from the position of the zero crossing of the radial field of the magnetic field generated by the transducer magnet on the scale defined by the sensor elements of the detecting unit. Without any further analog/digital conversion, the absolute angle value may consequently be forwarded as a digital measuring value via the bus 270, such as, for example, a CAN bus, to a motor control device (not shown).

An exemplary use of the throttle flap shown in FIG. 1 is for example an intake stroke of an internal combustion engine, with oscillations and vibrations becoming apparent, resulting in little highly frequent motions in potentio-metric solutions with a fixed angle position, which would damage a system operating on the basis of contacts. For use in the field of automative technology the life expectation of the system, however, has to be 12 years or more. In the vehicles trunk, high requirements are to be made to the temperature area. Resistance measurements are frequently flawed with high temperature drifts, such that the achievable angle accuracy becomes limited. Furthermore, the price pressure in this market segment is especially high, as a result of which the above-described cost-intensive contactless solutions are excluded even in view of their technical advantages.

Here, the use of an inventive sensor, as has been described with reference to FIG. 1, offers an enormous advantage. By using the inventive rotation angle sensor, a realization of the detector arrangement is enabled, in which the sensor elements together with an evaluation part may be integrated within one single die, which may for example be manufactured in CMOS standard technology. As a result of this, a possibly small surface is enabled. For the transducer no digital encoding of the angular positions is required. Although the signal transducer is somewhat more complex than for the magnetic encoding of sine/cosine signal systems, high accuracy is to be achieved given a more reduced measuring value processing time. In addition, the orientation information will be available immediately after turning on the rotation angle sensor and it is not necessary to wait until a certain significant position, such as, for example, a gear having a missing tooth, has been reached, until calculating the rotation angle and/or the orientation information becomes possible. In addition, an application for great temperature areas, as they occur in engines, is conceivable. For use with high temperatures, special substrates, such as, for example, SOI substrates (SOI= silicon on insulator) may be used for manufacturing the detector chip. In addition, the embodiment illustrated in FIG. 1 offers the advantage that only little temperature drifts occur in rotation angle determination, since the change of sensitivity of the sensors and the magnetic field are not directly entered into the measurement results.

With reference to the above-described special embodiment of a rotation angle sensor, reference is made to the following. Although a special magnetic transducer structure have been described above, other magnetic structures are further possible. For example, all magnetic transducer structures are possible, which, for an rotation angle area of interest, map a special characteristic of the magnetic field onto the scale defined by the sensor elements and in which the locus, onto which the characteristic is mapped, uniquely depends on the momentary rotation angle within the rotation angle area of interest.

Further, it should be appreciated, that, although it has already been described above, that the rotation angle for all occurring rotation angles uniquely originates from the locus of the zero crossing on the scale, it may be possible in special applications that the uniqueness is only required in a partial area, while for the total area of occurring rotation angles an ambiguity is not disturbing. In the application example from FIG. 4, the absolute angle value output by the rotation angle sensor indicates the rotation angle for example by an angle including the magnetization direction with a radial connection line between the detector arrangement and the axis of rotation, with 0° corresponding to the open position. If now the throttle flap can be also rotated beyond the area of 0° to 90° on the total full circle, in this case of application the ambiguity of an angle measurement may be tolerated, since, owing to the symmetry of the arrangement from FIG. 4, it is not significant for the fluid flow whether the throttle flap is in an rotation angle position of 30° or 330°.

With respect to the detector arrangement, it should be appreciated, that the sensor elements may also be arranged in a two-dimensional array. In the case of a linear arrangement of the sensor elements, it is further not required that the sensor elements are arranged in parallel to the axis of rotation. Although an arrangement of the sensor elements on a common level is preferred, it is further possible, that the sensor elements are arranged along a curved line, as a result of which a curved scale is defined. In the case of a flat arrangement of the sensor elements, the scale defined by the sensor elements corresponds to a curved or planar surface.

It should be further appreciated that, although it has been described above, the evaluation of the measuring values of the magnetic-field-sensitive sensor elements is carried out in an evaluation circuit, which is fixedly integrated within the same as are the sensor elements, it is further possible, that the data may be evaluated elsewhere, such as for example in a computer, an ASIC or a PLA by software, firmware or hardware, in which case the measuring values are output in an analogous form, for example by means of a flat band cable or printed circuit board.

Instead of the previously used zero crossing of the radial component of the magnetic field, a relative maximum, a relative minimum, etc. of the magnetic-field may be used as a characteristic of the same, that is in any direction or on an absolute-value basis.

Further, in contrast to the preceding description, inferences concerning the rotation angle may be directly made directly from the output signals, with first determining the locus of the magnetic-field characteristic from the scale, such as, for example, by pattern recognition with respect to the output signals of the sensor elements. For this purpose, the characteristic of the magnetic field along the scale serves only for a better differentiation of the varying output signal combinations in the varying rotation angles.

What is claimed is:

1. An apparatus for detecting a rotation angle of a rotation around an axis of rotation, comprising:

a transducer magnet for generating a magnetic field;

a plurality of magnetic-field-sensitive sensor elements for detecting the magnetic field, with the transducer magnet and the plurality of magnetic-field-sensitive sensor elements being arranged such that, when rotating around the axis of rotation, the plurality of magnetic-field-sensitive sensor elements circles around the same relative to the transducer magnet, and wherein the plurality of magnetic-field-sensitive sensor elements define a scale, with the transducer magnet being arranged such that the generated magnetic field comprises a characteristic at a locus on the scale, and the locus on the scale uniquely depends on the rotary angle at least for a partial area of a full rotation, wherein the transducer magnet is magnetized inclined to the axis of rotation.

2. The apparatus in accordance with claim 1, wherein the transducer magnet is fixedly arranged to the axis of rotation, and the plurality of magnetic-field-sensitive sensor elements is fixedly arranged such that the transducer magnet, when rotating around the axis of rotation, rotates relative to the plurality of magnetic-field-sensitive sensor elements.

3. The apparatus in accordance with claim 1, wherein the transducer magnet is of a cylindrical shape and is magnetized along the surface diagonal, with the symmetry axis of the transducer magnet coinciding with the axis of rotation.

4. The apparatus in accordance with claim 3, wherein the height and the diameter of the transducer magnet are essentially of the same size.

5. The apparatus in accordance with claim 1, wherein a rotation angle area within which the locus uniquely depends on the rotation angle, spans 180°.

6. The apparatus in accordance with o claim 1, further comprising:

means for generating a signal indicating a rotation angle partial area of a plurality of rotation angle partial areas, in which the rotation angle of the rotation is located; and means for receiving the signal indicating the rotation angle partial area, with the rotation angle partial areas together spanning a rotation angle area of 360°, and wherein a combination of the locus on the scale and the signal indicating the rotation angle partial area uniquely depends on the rotation angle.

7. The apparatus in accordance with claim 1, wherein a rotation angle area, for which the locus uniquely depends on the rotation angle, spans 360°, the apparatus further comprising:

a second plurality of magnetic-field-sensitive sensor elements offset by rotation around the axis of rotation relative to the first plurality of magnetic-field-sensitive sensor elements, with the generated magnetic field on a second locus on a scale defined by the second plurality of magnetic-field-sensitive sensor elements comprises the characteristic, and wherein the combination of the locus on the first scale and the locus on the second scale being uniquely dependent on the rotation angle.

8. The apparatus in accordance with claim 1, wherein the sensor elements are arranged on a level spaced from the axis of rotation and which is arranged in parallel to the same.

9. The apparatus in accordance with claim 1, wherein the plurality of magnetic-field-sensitive sensor elements are arranged in the form of a two-dimensional or one-dimensional array.

10. The apparatus in accordance with claim 1, wherein the plurality of magnetic-field-sensitive sensor elements are Hall sensors integrated within a die.

11. The apparatus in accordance with claim 1, wherein the plurality of magnetic-field-sensitive sensor elements are arranged linear and in parallel to the axis of rotation.

12. The apparatus in accordance with claim 1, wherein the characteristic is selected from a group including a zero crossing, a relative minimum and a relative maximum of a component of the magnetic field in a predetermined direction and/or of the magnitude of the magnetic-field.

13. The apparatus in accordance with claim 1, wherein the characteristic is the zero crossing of the radial component of the magnetic field, and the plurality of magnetic-field-sensitive sensor elements is arranged to detect the radial component of the magnetic field.

14. The apparatus in accordance with claim 1, further comprising:

means for inferring concerning the rotation angle from the magnetic field detected by the magnetic-field-sensitive sensor elements.

15. The apparatus in accordance with claim 14, wherein the means for inferring comprises the following:

means for determining the locus on the scale from the magnetic field detected by the plurality of magnetic-field-sensitive sensor elements and for inferring concerning the rotation angle from the determined locus.

16. The apparatus in accordance with claim 15, wherein the means for determining and inferring comprises a means for interpolating the magnetic field detected by the plurality of magnetic-field-sensitive sensor elements, so as to determine the locus on the scale.

* * * * *